(12) United States Patent
Kim et al.

(10) Patent No.: US 10,815,867 B2
(45) Date of Patent: Oct. 27, 2020

(54) CONTROL METHOD OF COOLING SYSTEM FOR VEHICLE

(71) Applicants: Hyundai Motor Company, Seoul (KR); Kia Motors Corporation, Seoul (KR)

(72) Inventors: Han Sang Kim, Gyeonggi-do (KR); Seong Sik Kim, Gyeonggi-do (KR); Dongho Lee, Gyeonggi-do (KR); Sun Gyu Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 85 days.

(21) Appl. No.: 16/167,086

(22) Filed: Oct. 22, 2018

(65) Prior Publication Data

US 2020/0040800 A1 Feb. 6, 2020

(30) Foreign Application Priority Data

Aug. 1, 2018 (KR) .......................... 10-2018-0089818

(51) Int. Cl.
*F01P 7/16* (2006.01)
*F01P 7/14* (2006.01)
(Continued)

(52) U.S. Cl.
CPC .................. *F01P 7/14* (2013.01); *F01P 3/20* (2013.01); *F01P 5/10* (2013.01); *F02M 26/28* (2016.02);
(Continued)

(58) Field of Classification Search
CPC .......... F01P 7/14; F01P 2007/146; F01P 5/10; F01P 3/20; F01P 7/16; F01P 7/165;
(Continued)

(56) References Cited

U.S. PATENT DOCUMENTS

2016/0138530 A1* 5/2016 Lee .......................... F02M 26/22
123/568.12

FOREIGN PATENT DOCUMENTS

| JP | 4571897 B2 | 10/2010 |
| JP | 2016-138513 A | 8/2016 |
| KR | 10-2008-0027683 A | 3/2008 |

OTHER PUBLICATIONS

JinYong Kim et al., "The Next Generation 1.6L Naturally Aspirated Gasoline Engine from Hyundai-Kia", 26th Aachen Colloquium Automobile and Engine Technology 2017, Oct. 11, 2017.

* cited by examiner

*Primary Examiner* — Jacob M Amick
(74) *Attorney, Agent, or Firm* — Mintz Levin Cohn Ferris Glovsky and Popeo, P.C.; Peter F. Corless

(57) ABSTRACT

A method for controlling a cooling system for a vehicle is provided. The system includes an engine, an EGR cooler, an oil cooler, a heater, a radiator, and a controller. The engine, the EGR cooler, the oil cooler, the heater, and the radiator are respectively connected through a coolant line and coolant circulates through the engine, the EGR cooler, the oil cooler, the heater, and the radiator by operation of a water pump. The controller receives the coolant from the engine and operates a control valve connected with the oil cooler, the heater, and the radiator. The method includes sensing driving conditions and operating the control valve when a warm mode is required to rapidly warm up the engine based on the sensed driving conditions. The control valve is operated based on modes that are controlled depending on a coolant temperature, and among modes, one is iteratively performed.

19 Claims, 7 Drawing Sheets

(51) Int. Cl.
  *F01P 3/20* (2006.01)
  *F02M 26/28* (2016.01)
  *F01P 5/10* (2006.01)
  *B60K 11/02* (2006.01)
(52) U.S. Cl.
  CPC ......... *B60K 11/02* (2013.01); *F01P 2007/146* (2013.01); *F01P 2050/22* (2013.01); *F01P 2060/04* (2013.01); *F01P 2060/08* (2013.01)
(58) Field of Classification Search
  CPC .. F01P 2060/04; F01P 2060/08; F02M 26/28; F02M 26/23; B60K 11/02
  See application file for complete search history.

CONTROL METHOD OF COOLING SYSTEM FOR VEHICLE

CROSS-REFERENCE TO RELATED APPLICATION

This application claims priority to and the benefit of Korean Patent Application No. 10-2018-0089818 filed on Aug. 1, 2018, the entire contents of which are incorporated herein by reference.

BACKGROUND

(a) Field of the Invention

The present invention relates to a method for controlling a cooling system for a vehicle, and more particularly, to a method for controlling a cooling system for a vehicle to improve fuel efficiency of the vehicle by adjusting coolant flow in a warm mode, which requires a rapid warm-up time of an engine.

(b) Description of the Related Art

In general, an engine exhausts heat energy while generating torque from combustion of fuel, and a coolant absorbs the heat energy while circulating through the engine, a heater, and a radiator, and emits the absorbed heat energy to the outside. When a coolant temperature of the engine is excessively high, knocking occurs, and thus ignition timing needs to be adjusted to suppress occurrence of knocking, thereby causing deterioration of engine performance. When a lubricant temperature is too high, viscosity becomes low, thereby causing deterioration of lubrication performance.

Further, when a coolant temperature of the engine is excessively low, oil viscosity is increased and thus frictional force is increased, fuel consumption is increased, a temperature of exhaust gas is slowly increased. Accordingly, the time to activate a catalyst is increased, and quality of exhaust gas is deteriorated. In addition, time taken for normalizing the heater is increased, thereby causing inconvenience to a driver or an occupant within the vehicle. In particular, since viscosity of engine oil is increased when the engine is started in a cold condition such as a winter season, engine output and efficiency are deteriorated, thereby causing deterioration of fuel efficiency. Further, since incomplete combustion of fuel occurs when a temperature of the combustion chamber is low, exhaust gas may be excessively discharged.

Thus, since a single coolant control valve is applied to control several cooling elements, the temperature of the coolant in a particular portion is maintained to be high and the temperature of the coolant in another portion is maintained to be low. In other words, a technology for controlling each part of the coolant passing through a radiator, a heater core, an exhaust gas recirculation (EGR) cooler, an oil cooler, or a cylinder block using one coolant control valve unit has been researched, and a method for effectively controlling the control valve based on a mode of the vehicle has been researched.

The above information disclosed in this section is merely for enhancement of understanding of the background of the invention and therefore it may contain information that does not form the prior art that is already known in this country to a person of ordinary skill in the art.

SUMMARY

The present invention provides a method for controlling a vehicle cooling system to increase a temperature of a coolant and improve fuel efficiency by adjusting a coolant flow through operation control of a control valve in a warm-up mode, which requires rapid warming up of an engine.

According to an exemplary embodiment of the present invention, a method is provided for controlling a vehicle cooling system that includes an engine, an EGR cooler, an oil cooler, a heater, a radiator, and a controller, wherein the engine, the EGR cooler, the oil cooler, the heater, and the radiator are respectively connected via a coolant line and coolant circulates through the engine, the EGR cooler, the oil cooler, the heater, and the radiator by operation of a water pump, and the controller receives the coolant from the engine and adjusts a control valve that is connected with the oil cooler, the heater, and the radiator. In particular, the method may include: sensing driving conditions; and operating the control valve when a warm mode is required to rapidly warm up the engine among the sensed driving conditions, wherein the operating of the control valve includes a plurality of modes that are executed depending on a coolant temperature, and among the plurality of modes, one is iteratively performed.

In the mode that is iteratively performed among the plurality of modes, the coolant circulating by operation of the water pump may circulate to the EGR cooler without passing through the engine. Between the iteratively performed modes, one of modes that circulates the coolant to the oil cooler or the heater or to the oil cooler and the heater, excluding the radiator, may be performed. The control valve may include: a first connection line that receives a coolant from the engine and through which a coolant distributed to the oil cooler may flow; a second connection line through which a coolant distributed to the heater may flow; and a third connection line through which a coolant distributed to the radiator may flow, and the modes include a first mode to a fifth mode.

In the first mode, the first, second, and third connection lines may be blocked by operating the control valve, and a coolant circulating by operation of the water pump may be adjust to pass through only the EGR cooler without passing through the engine. In the second mode, the first connection line may be opened and the second and third connection lines may be blocked by operating the control valve, and the coolant circulating by operation of the water pump may be adjusted to pass through the engine and the EGR cooler, and the coolant introduced to the control valve from the engine may be circulated to pass through the oil cooler through the first connection line.

In the third mode, the first and second connection lines may be opened and the third connection line may be blocked by operating the control valve, and the coolant circulating by the operation of the water pump may be adjusted to pass through the engine and the EGR cooler, and the coolant introduced to the control valve from the engine may be circulated to pass through the oil cooler and the heater through the first and second connection lines. In the fourth mode, the first, second, and third connection lines are opened by operating the control valve, and the coolant circulating by the water pump may be adjusted to pass through the engine and the EGR cooler, and the coolant introduced into the control valve from the engine may be adjusted to pass through the oil cooler, the heater, and the radiator through the first, second, and third connection lines.

In the fifth mode, the second connection line may be opened and the first and third connection lines may be closed by operating the control valve, and the coolant circulating by operation of the water pump may be adjusted to pass through the engine and the EGR cooler, and the coolant introduced into the control valve from the engine may be circulated to pass through the heater through the second connection line. When the warm-up mode starts, the controller may be configured to sequentially perform the first mode, the fifth mode, and the first mode.

In the operating of the control valve, the first mode, the fifth mode, the first mode, the second mode, the third mode, and the fourth mode may be sequentially performed. In the first mode, a coolant temperature may be increased to a second predetermined temperature. In the first mode, a coolant temperature may be increased to a second predetermined temperature.

The fifth mode may be performed until a temperature of the coolant discharged from the EGR cooler reaches a fourth predetermined temperature. The second mode may be performed until a coolant temperature reaches a fifth predetermined temperature. The third mode may be performed until a coolant temperature reaches a sixth predetermined temperature. The operating of the control valve may be performed when an outdoor temperature is greater than a first predetermined temperature and a cooling fan is in a turned-off state.

A coolant temperature may be increased to a second predetermined temperature in the first mode, the coolant temperature may be increased to a third predetermined temperature in the first mode that is repeated after the fifth mode, the fifth mode may be performed until a coolant temperature discharged from the EGR cooler reaches a fourth predetermined temperature, the second mode may be performed until the coolant temperature reaches a fifth predetermined temperature, and the third mode may be performed until the coolant temperature reaches a sixth predetermined temperature. The second to third predetermined temperatures and the fifth to sixth predetermined temperatures may be gradually increased from the second predetermined temperature to the sixth predetermined temperature.

As described above, the method for controlling the vehicle cooling system according to the exemplary embodiment of the present invention may increase a temperature of a coolant and improve fuel efficiency by adjusting a coolant flow by operating a control valve in a warm-up mode, which requires rapid warm-up of the engine. In addition, since the engine may be warmed up rapidly, cooling or heating of the interior of the vehicle depending on a user's demand may be optimized, thereby improving marketability of the vehicle.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DESCRIPTION OF SYMBOLS

Figure 1:
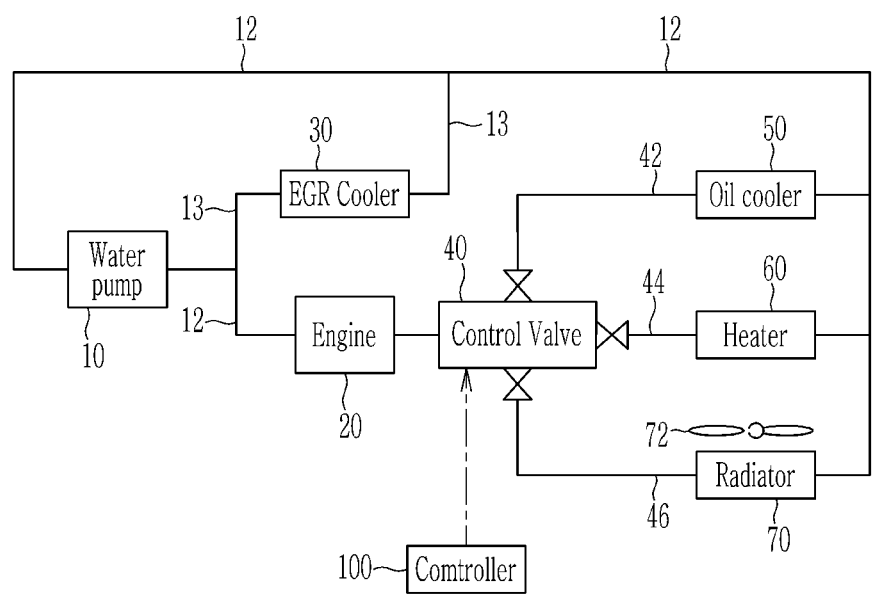
FIG. 1 is a schematic diagram of a cooling system for a vehicle, to which a method for controlling a vehicle cooling system according to an exemplary embodiment of the present invention is applied.

10: water pump
12: coolant line
13: EGR coolant line
20: engine
30: EGR cooler
40: control valve
42, 44, 46: first, second, and third connection lines
50: oil cooler
60: heater
70: radiator
72: cooling fan

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment of the present invention will hereinafter be described in detail with reference to the accompanying drawings. Although exemplary embodiments have been described with reference to a number of illustrative exemplary embodiments thereof, it should be understood that numerous other modifications and embodiments can be devised by those skilled in the art that will fall within the spirit and scope of the principles of the present invention. The drawings and description are to be regarded as illustrative in nature and not restrictive. Like reference numerals designate like elements throughout the specification. Since the size and the thickness of each configuration shown in the drawings are arbitrarily indicated for better understanding and ease of description, the present invention is not limited to shown drawings, and the thickness of layers, films, panels, regions, etc., are exaggerated for clarity.

FIG. 1 shows a cooling system for a vehicle, to which a control method of a vehicle cooling system according to an exemplary embodiment of the present invention is applied. Referring to FIG. 1, a vehicle cooling system according to an exemplary embodiment of the present invention may include an engine 20, an EGR cooler 30, an oil cooler 50, a heater 60, and a radiator 70. The engine 20, the EGR cooler 30, the oil cooler 50, the heater 60, and the radiator 60 may be respectively connected via a coolant line 12, and a coolant may be circulated therethrough through operation of a water pump 10.

The water pump 10 may be configured to pump a coolant to the engine 20 and the EGR cooler 30 through the coolant line 12. The pumped coolant may be distributed to the engine 20 and the EGR cooler 30. Particularly, the EGR cooler 30 may be connected with the coolant line 12 via an EGR coolant line 13 branched from the coolant line 12 to distribute the coolant discharged from the water pump 10 thereto. The EGR coolant line 13 may be passed through the EGR cooler 30 and then may be connected with the coolant line 12 again. Accordingly, the coolant pumped through operation of the water pump 10 may be selectively supplied to the engine 20 through the coolant line 12, and may always be supplied to the EGR cooler 30 through the EGR coolant line 13.

The cooling system may further include a control valve 40 disposed at a coolant outlet side of the engine 20 and the control valve 40 may be configured to receive a coolant discharged from the engine 10. The control valve 40 may be configured to operate according to a control signal of a controller 100. The controller 100 may be implemented as at least one microprocessor operated by a predetermined program which may include a series of commands for carrying out a method in accordance with an exemplary embodiment of the present invention.

The control valve 40 may be connected with the oil cooler 50, the heater 60, and the radiator 70 respectively via a first connection line 42, a second connection line 44, and a third connection line 46. A coolant distributed to the oil cooler 50 from the control valve 40 may flow through the first connection line 42. A coolant distributed to the heater 60 from the control valve 40 may flow through the second connection line 44. A coolant distributed to the radiator 70 from the control valve 40 may flow through the third connection line 46. In particular, the radiator 70 may be disposed at a front of the vehicle, and a cooling fan 72 may be provided at a rear side of the radiator 70.

The control valve 40 may be configured to selectively open and close the first, second, and third connection lines 42, 44, and 46, and adjust an opening rate of each of the first, second, and third connection lines 42, 44, and 46 based on a rotation position of a cap (not shown) provided therein. In other words, the control valve 40 may be operated by the controller 100 according to a driving condition of the vehicle and heating or cooling of the interior of the vehicle. Additionally, coolant discharged from the engine 20 may be circulated by being selectively supplied to the oil cooler 50, the heater 50, and the radiator 70 to thus adjust a coolant temperature.

Figure 2:
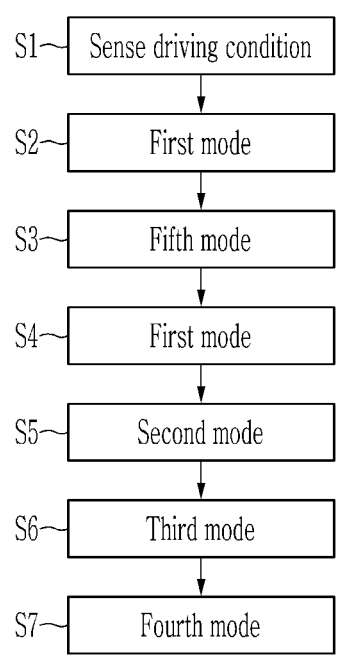
FIG. 2 is a flowchart of the control method of the vehicle cooling system according to the exemplary embodiment of the present invention.

FIG. 2 is a flowchart of a control method of the vehicle cooling system according to the exemplary embodiment of the present invention, and FIG. 3 to FIG. 7 are operation state views of a cooling system of each mode in the control method of the vehicle cooling system according to the exemplary embodiment of the present invention. Referring to FIG. 2, the controller 100 may be configured to sense a vehicle driving condition that includes a temperature of a coolant, a temperature of outdoor air, and the like (S1).

When a rapid warm mode of the engine 20 is required according to the sensed driving condition, the controller 100 may be configured to operate the control valve 40. In particular, the control valve 40 may be operated when an outdoor temperature is greater than a first predetermined temperature, and the cooling fan 72 is in a turn-off state. The first predetermined temperature may be greater than about 15° C. In addition, the control process of the control valve 40 includes a plurality of modes that are executed based on a coolant temperature, and one of the plurality of modes may be iteratively performed. In addition, among the modes, a coolant that circulates by operation of the water pump 10 may circulate to the EGR cooler 30 without passing through the engine 20 in the iteratively performed mode (e.g., one mode may be repeated).

One of modes that circulates a coolant to the oil cooler 50, the heater 60, or the oil cooler 50 and the heater 60, excluding the radiator 70, may be executed between the iteratively performed modes. In other words, in the present exemplary embodiment, the control process may include first to fifth modes that are executed according to a coolant temperature, and the first among the first to fifth modes may be iteratively performed. In addition, when the warm-up mode is started, the controller 100 may be configured to sequentially execute the first mode, the fifth mode, and the first mode.

Figure 3:
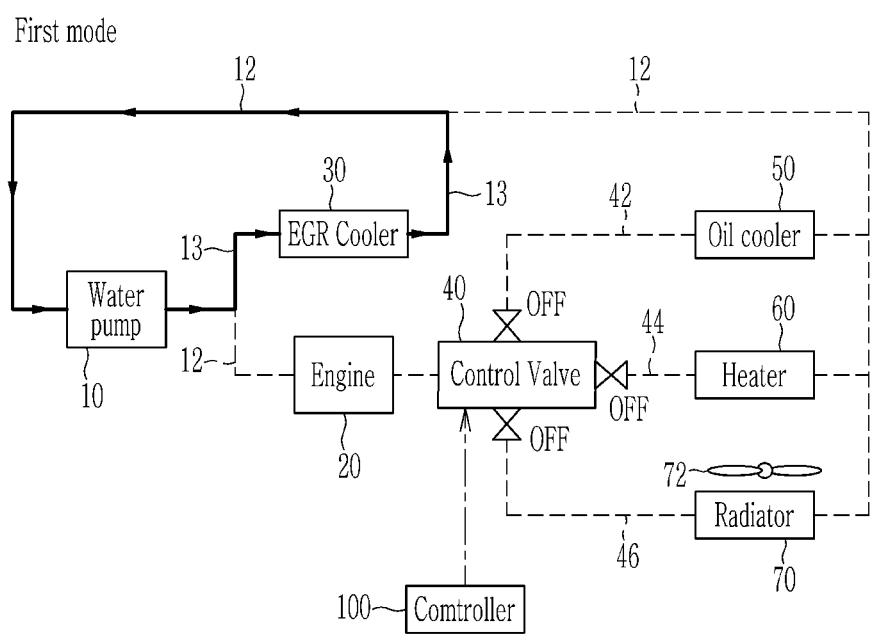
FIG. 3 to FIG. 7 are operation state views of the cooling system depending on each mode in the method for controlling the vehicle cooling system according to the exemplary embodiment of the present invention.

In the first mode, as shown in FIG. 3, the controller 100 may be configured to block the first, second, and third connection lines 42, 44, and 46 by operating the control valve 40, and may circulate the coolant that circulates by operation of the water pump 10 to pass through the EGR cooler 30 through the EGR coolant line 13 without passing through the engine 20. In other words, in the first mode, the coolant may not flow to the engine 20 and thus minimizes the flow of the coolant to thus increase a temperature of engine oil and a temperature of the coolant in a low-temperature state.

Figure 4:
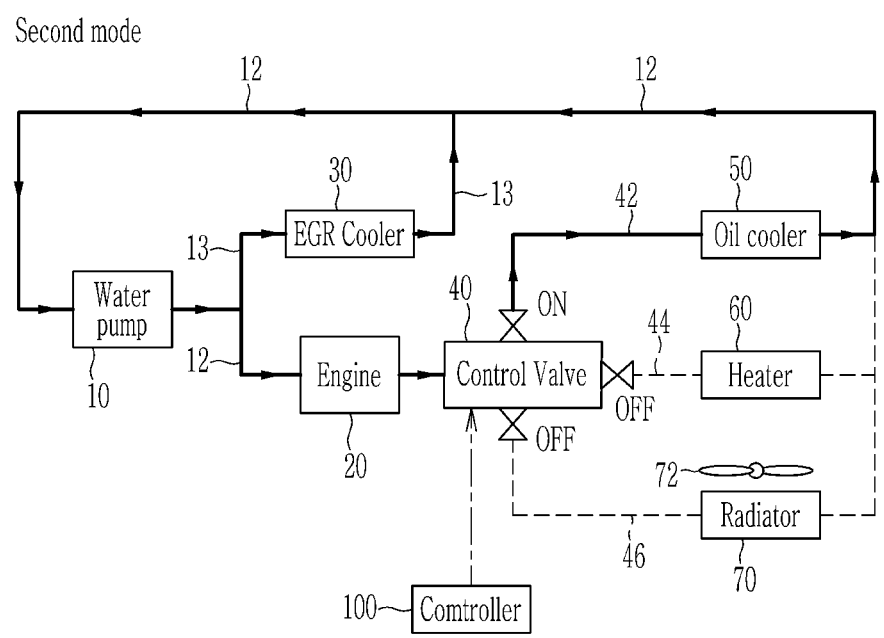

In the second mode, as shown in FIG. 4, the controller 100 may be configured to open the first connection line 42 and block the second and third connection lines 44 and 46 by operating the control valve 40. Thus, the coolant circulating by operation of the water pump 10 may pass through the engine 20 through the coolant line 12, and pass through the EGR cooler 30 through the EGR coolant line 13. In addition, a coolant introduced into the control valve 40 from the engine 20 may be passed through the oil cooler 50 through the first connection line 42, and then may circulate along the coolant line 12. In other words, the second mode is a section that is activated when the oil cooler 50 is used, and warm-up is performed.

Figure 5:
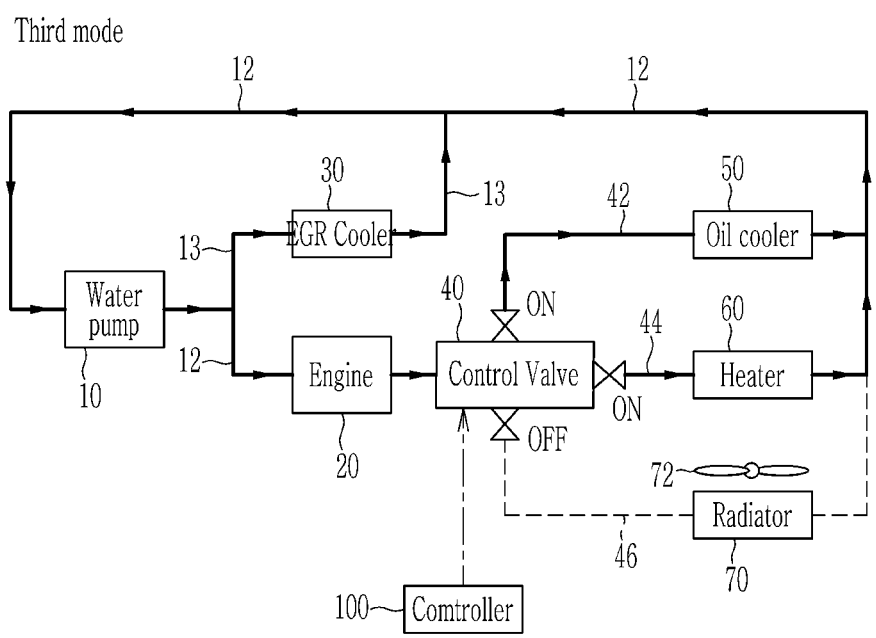

In the third mode, as shown in FIG. 5, the controller 100 may be configured to open the first and second connection lines 42 and 44 and block the third connection line 46 by operating the control valve 40, and may adjust the coolant circulating by operation of the water pump to pass through the engine 20 and the EGR cooler 30. In addition, the coolant introduced into the control valve 40 from the engine 20 may be passed through the oil cooler 50 and the heater 60 through the first and second connection lines 42 and 44 and then may circulate along the coolant line 12. In other words, the third mode is a section that is activated when the oil cooler 50 and the heater 60 are used, and the warm-up is performed as in the second mode.

Figure 6:
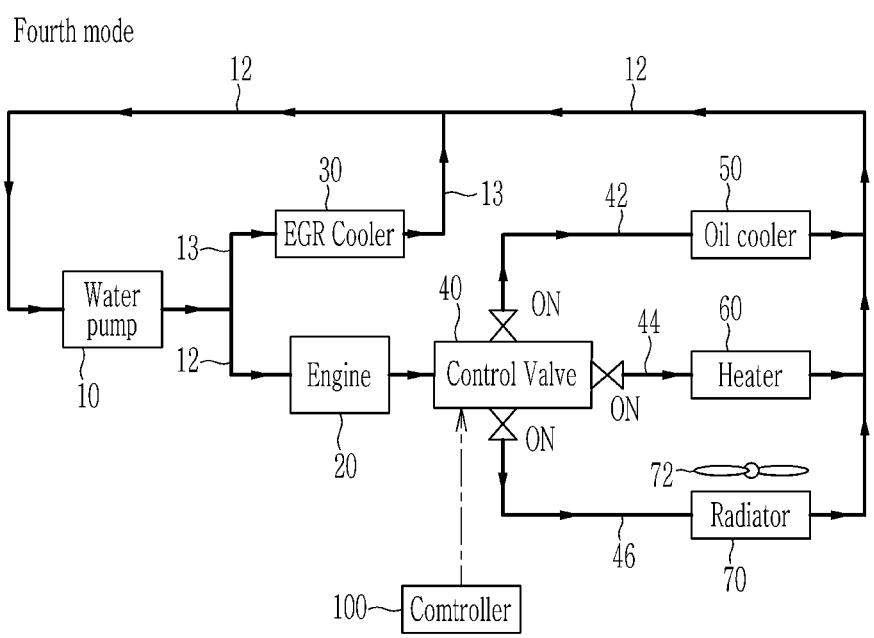

In the fourth mode, as shown in FIG. 6, the controller 100 may be configured to open the first, second, and third connection lines 42, 44, and 46 by operating the control valve 40, and may adjust the coolant circulating by operation of the water pump 10 to pass through the engine 20 and the EGR cooler 30. In addition, the coolant introduced to the control valve 40 from the engine 20 may be passed through the oil cooler 50, the heater 60, and the radiator 70 through the first, second, and third connection line 42, 44, and 46 and then may circulate along the coolant line 12. In other words, the fourth mode is a radiator cooling section, and thus may adjust a target temperature of the coolant by adjusting a cooling amount based on a driving area of the engine 20.

Figure 7:
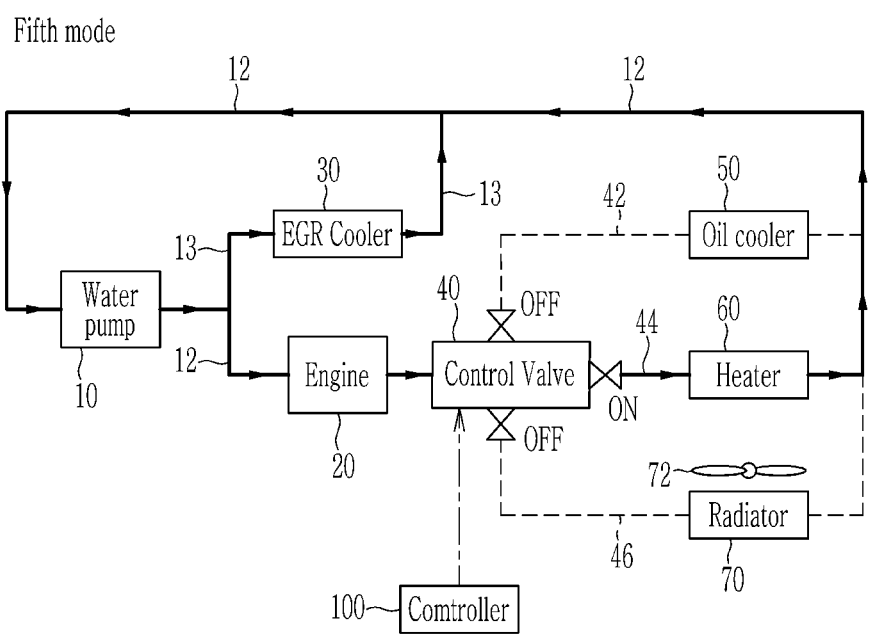

In addition, in the fifth mode, as shown in FIG. 7, the controller 100 may be configured to open the second connection line 44 and block the first and third connection line 42 and 46 by operating the control valve 40, and may adjust the coolant circulating by operation of the water pump 10 to pass through the engine 20 and the EGR cooler 30. In addition, the coolant introduced to the control valve 40 from the engine 20 may be passed through the heater 60 through the second connection line 44, and then may circulate along the coolant line 12. In other words, the fifth mode is a maximum heating section for optimized heating performance at an area where an outdoor temperature is low by circulating a temperature-increased coolant to the heater 50 while cooling the engine 20.

Meanwhile, in the present exemplary embodiment, the first, second, and third connection lines 42, 44, and 46 may be opened or closed in the first to fifth modes, but this is not restrictive. When the first, second, and third connection lines 42, 44, and 46 are opened, an opening degree of each of the first, second, and third connection lines 42, 44, and 46 may be adjusted to be a predetermined degree. In other words, a cam for adjusting an opening degree of each of the first, second, and third connection lines 42, 44, and 46 may be provided in the control valve 40, and the opening degree of the connection lines may be adjusted according to a rotation position of the cam.

Referring back to FIG. 2, the controller 100 may be configured to sense a driving condition of the vehicle (S1), and then the controller 100 may be configured to execute the first mode if a warm mode for rapid warm-up is required (S2) (e.g., rapid temperature increase is required). In the first mode, the first, second, and third connection lines 42, 44, and 46 may all be closed, and accordingly, supply of the coolant to the oil cooler 50, the heater 60, and the radiator 70 may be stopped. The coolant in the coolant line 12 may be circulated by passing through only the EGR cooler 300 through the EGR coolant line 13 branched from the coolant line 12 without passing through the engine 20.

Accordingly, a temperature of the coolant may be increased through heat exchange with exhaust gas that is discharged from the engine 20 and may pass through the EGR cooler 30. In other words, when the warm-up mode starts, the first mode started by the controller 100 becomes a primary flow stop section during which the coolant may flow only to the EGR cooler 30 without supplying the coolant to the engine 20. Particularly, in the first mode, the temperature of the coolant may be increased to a second predetermined temperature, and the second predetermined temperature may be set to be about 72° C.

When the coolant temperature is increased to the second predetermined temperature, the controller 100 may be configured to execute the fifth mode (S3). In the fifth mode, the coolant may be supplied to the heater 60 through the opened second connection line 44. Accordingly, the coolant in the coolant line 12 may pass through the engine 20 and the EGR cooler 30. In addition, the coolant introduced into the control valve 40 from the engine 20 may pass through the heater 60 through the second connection line 44 and then may circulate along the coolant line 12. Accordingly, the coolant temperature may decrease to less than that in the first mode while passing through the heater 60. In other words, the controller 100 may be configured to execute the fifth mode until a temperature of the coolant discharged from the EGR cooler 30 reaches a fourth predetermined temperature. The fourth temperature may be set to be about 60° C.

When the temperature of the coolant discharged from the EGR cooler 30 reaches about 60° C., the controller 100 may be configured to repeat execution of the first mode to minimize a flow of the coolant (S4). In particular, the controller 100 may be configured to increase the coolant temperature to a third predetermined temperature in the first mode that is repeated after the fifth mode. The third predetermined temperature may be set to be about 76.5° C. In other words, the repeated first mode after the fifth mode is a secondary flow stop section of the coolant during which the coolant may be adjusted to flow only to the EGR cooler 30 without supplying the coolant to the engine 20.

Since the flow of the coolant is secondarily stopped as stated above, performance of the EGR cooler 30 may be assured, and at the same time the coolant may be promptly heated to reach a higher temperature. When the coolant temperature is increased to the third predetermined temperature, the controller 100 may be configured to execute the second mode (S5). In the second mode, the coolant may be supplied to the oil cooler 50 through the opened first connection line 42. Accordingly, the coolant in the coolant line 12 may pass through the engine 20 and the EGR cooler 30. In addition, the coolant introduced into the control valve 40 from the engine 20 may pass through the oil cooler 50 through the first connection line 42, and then may circulate along the coolant line 12.

The coolant of which the temperature is increased to the third predetermined temperature warms the oil cooler 50 while the second mode is performed. In particular, the controller 100 may be configured to execute the second mode until the temperature of the coolant reaches a fifth predetermined temperature. The fifth predetermined temperature may be set to be about 97° C. In other words, when the coolant temperature reaches about 97° C., the controller 100 may be configured to execute the third mode (S6).

In the third mode, the coolant discharged from the engine 20 may be supplied to the oil cooler 50 and the heater 60 through the opened first and second connection lines 42 and 44. Accordingly, the coolant in the coolant line 12 may pass through the engine 20, and may pass through the EGR cooler 30 through the EGR coolant line 13. In addition, the coolant introduced into the control valve 40 from the engine 20 may pass through the oil cooler 50 and the heater 60 through the first and second connection lines 42 and 44 and then may circulate along the coolant line 12.

In particular, the coolant of which the temperature is increased to the fifth predetermined temperature (i.e., about 97° C.) may increase the oil cooler 50 and the heater 60 temperature while warming up the engine 20, and the controller 100 may be configured to execute the third mode until the coolant temperature reaches a sixth predetermined temperature. The sixth predetermined temperature may be set to be about 99° C. In other words, when the coolant temperature reaches about 99° C., the controller 100 may be configured to execute the fourth mode (S7).

In the fourth mode, the coolant discharged from the engine 20 may be supplied to the oil cooler 50, the heater 60, and the radiator 70 through the opened first, second, and third connection lines 42, 44, and 46. Accordingly, the coolant in the coolant line 12 may pass through the engine 20, and at the same time, may pass through the EGR cooler 30 through the EGR coolant line 13. In addition, the coolant introduced into the control valve 40 from the engine 20 may pass through the oil cooler 50, the heater 60, and the radiator 70 through the first, second, and third connection lines 42, 44, and 46, and then may circulate along the coolant line 12.

In the present exemplary embodiment, the controller 100 may be configured to open the third connection line 46 connected with the radiator 70 together with the first and second connection lines 42 and 44 when the coolant temperature reaches a sixth predetermined temperature (i.e., about 99° C.), and thus a temperature of the coolant may be decreased to a target temperature by adjusting a cooling amount based on a driving area of the engine 20. Particularly, temperatures from the second to third predetermined temperatures and fifth to sixth predetermined temperatures may be gradually increased. In other words, the controller 100 may be configured to sequentially execute the first mode, the fifth mode, the first mode, the second mode, the third mode, and the fourth mode through the above-described process when a warm-up mode is required to rapidly warm up the engine 20.

Meanwhile, in the present exemplary embodiment, the first mode may be iteratively performed and the fifth mode may be performed between the first modes and thus, the coolant heated while passing through the engine 20 may flow through the coolant line 12, but this may be determined based on heat capacity of the oil cooler 50 and the heater 60 and thus is not restrictive. In other words, instead of performing the fifth mode between the iteratively performed first modes, the second mode during which the coolant flows only to the oil cooler 50 or the third mode during which the coolant flows only to the oil cooler 50 and the heater 60 may be performed.

In addition, the first mode, which is a flow stop section for minimizing coolant flow, may be iteratively performed, and accordingly, a coolant flow in the warm-up mode may be more effectively controlled. Thus, when the method for controlling the vehicle cooling system according to the above-described exemplary embodiment is applied, the coolant flow may be adjusted by operating the control valve 40 in the warm-up mode that requires rapid warm-up of the engine 20, and accordingly, a coolant temperature may be promptly increased and at the same time fuel efficiency of the vehicle may be improved. In addition, since the engine 20 may be rapidly warmed up, cooling or heating the interior of the vehicle depending on a user's demand may be optimized, thereby improving marketability of the vehicle.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for controlling a vehicle cooling system that includes an engine, an exhaust gas recirculate (EGR) cooler, an oil cooler, a heater, a radiator, and a controller, wherein the engine, the EGR cooler, the oil cooler, the heater, and the radiator are respectively connected through a coolant line and coolant circulates through the engine, the EGR cooler, the oil cooler, the heater, and the radiator by operation of a water pump, and the controller receives the coolant from the engine and operates a control valve that is connected with the oil cooler, the heater, and the radiator, the method comprising:
   sensing, by the controller, a plurality of driving conditions; and
   operating, by the controller, the control valve when a warm mode is required to rapidly warm up the engine based on the sensed driving conditions,
   wherein the control valve is operated based on a plurality of modes that are adjusted depending on a coolant temperature,
   wherein one of the plurality of modes is iteratively performed, and
   wherein one of the plurality of modes is the coolant circulating without passing through the engine.

2. The method for controlling the vehicle cooling system of claim 1, wherein in the mode that is iteratively performed, the coolant circulating by operation of the water pump circulates to the EGR cooler without passing through the engine.

3. The method for controlling the vehicle cooling system of claim 2, wherein, between the iteratively performed modes, one of modes that circulates the coolant to the oil cooler or the heater or to the oil cooler and the heater, excluding the radiator, is performed.

4. The method for controlling the vehicle cooling system of claim 1, wherein the control valve includes:
   a first connection line that receives a coolant from the engine and through which a coolant distributed to the oil cooler flows;
   a second connection line through which a coolant distributed to the heater flows; and
   a third connection line through which a coolant distributed to the radiator flows,
   wherein the plurality of modes include a first mode, a second mode, a third mode, a fourth mode, and a fifth mode.

5. The method for controlling the vehicle cooling system of claim 4, wherein, in the first mode, the method includes:
   blocking, by the controller, the first, second, and third connection lines by operating the control valve; and
   operating, by the controller, the water pump to circulate a coolant to pass through only the EGR cooler without passing through the engine.

6. The method for controlling the vehicle cooling system of claim 4, wherein, in the second mode, the method includes:
    opening, by the controller, the first connection line and blocking the second and third connection lines by operating the control valve; and
    operating, by the controller, the water pump to circulate the coolant to pass through the engine and the EGR cooler, and to circulate the coolant introduced to the control valve from the engine to pass through the oil cooler through the first connection line.

7. The method for controlling the vehicle cooling system of claim 4, wherein, in the third mode, the method includes:
    opening, by the controller, the first and second connection lines and blocking the third connection line by operating the control valve; and
    operating, by the controller, the water pump to circulate the coolant to pass through the engine and the EGR cooler, and to circulate the coolant introduced to the control valve from the engine to pass through the oil cooler and the heater through the first and second connection lines.

8. The method for controlling the vehicle cooling system of claim 4, wherein, in the fourth mode, the method include:
    opening, by the controller, the first, second, and third connection lines by operating the control valve; and
    operating, by the controller, the water pump to circulate, the coolant to pass through the engine and the EGR cooler, and to circulate the coolant introduced into the control valve from the engine to pass through the oil cooler, the heater, and the radiator through the first, second, and third connection lines.

9. The method for controlling the vehicle cooling system of claim 4, wherein, in the fifth mode, the method includes:
    opening, by the controller, the second connection line and closing the first and third connection lines by operating the control valve; and
    operating, by the controller, the water pump to circulate the coolant to pass through the engine and the EGR cooler, and to circulate the coolant introduced into the control valve from the engine to pass through the heater through the second connection line.

10. The method for controlling the vehicle cooling system of claim 4, wherein, when the warm-up mode starts, the controller is configured to sequentially execute the first mode, the fifth mode, and the first mode.

11. The method for controlling the vehicle cooling system of claim 4, wherein, in the operation of the control valve, the first mode, the fifth mode, the first mode, the second mode, the third mode, and the fourth mode are sequentially performed.

12. The method for controlling the vehicle cooling system of claim 11, wherein, in the first mode, a coolant temperature is increased to a second predetermined temperature.

13. The method for controlling the vehicle cooling system of claim 11, wherein, in the first mode that is repeated after the fifth mode, a coolant temperature is increased to a third predetermined temperature.

14. The method for controlling the vehicle cooling system of claim 11, wherein the fifth mode is performed until a temperature of the coolant discharged from the EGR cooler reaches a fourth predetermined temperature.

15. The method for controlling the vehicle cooling system of claim 11, wherein the second mode is performed until a coolant temperature reaches a fifth predetermined temperature.

16. The method for controlling the vehicle cooling system of claim 11, wherein the third mode is performed until a coolant temperature reaches a sixth predetermined temperature.

17. The method for controlling the vehicle cooling system of claim 1, wherein the operation of the control valve is performed when an outdoor temperature is greater than a first predetermined temperature and a cooling fan is in a turned-off state.

18. The method for controlling the vehicle cooling system of claim 4, wherein when a coolant temperature is increased to a second predetermined temperature in the first mode and the coolant temperature is increased to a third predetermined temperature in the first mode that is repeated after the fifth mode, the fifth mode is performed until a coolant temperature discharged from the EGR cooler reaches a fourth predetermined temperature, the second mode is performed until the coolant temperature reaches a fifth predetermined temperature, and the third mode is performed until the coolant temperature reaches a sixth predetermined temperature.

19. The method for controlling the vehicle cooling system of claim 18, wherein the second to third temperatures and the fifth to sixth predetermined temperatures are gradually increased from the second predetermined temperature to the sixth predetermined temperature.

\* \* \* \* \*